US010982300B2

United States Patent
Yu et al.

(10) Patent No.: US 10,982,300 B2
(45) Date of Patent: Apr. 20, 2021

(54) CARBOTHERMIC DIRECT REDUCTION OF CHROMITE USING A CATALYST FOR THE PRODUCTION OF FERROCHROME ALLOY

(71) Applicant: Her Majesty the Queen in Right of Canada as Represented by the Minister of Natural Resources, Ottawa (CA)

(72) Inventors: Dawei Yu, Ottawa (CA); Dogan Paktunc, Ottawa (CA)

(73) Assignee: Her Majesty the Queen in Right of Canada as represented by the Minister of Natural Resources, Ottawa (CA)

( * ) Notice: Subject to any disclaimer, the term of this patent is extended or adjusted under 35 U.S.C. 154(b) by 0 days.

(21) Appl. No.: 16/499,059

(22) PCT Filed: Aug. 2, 2017

(86) PCT No.: PCT/CA2017/050923
§ 371 (c)(1),
(2) Date: Sep. 27, 2019

(87) PCT Pub. No.: WO2018/201218
PCT Pub. Date: Nov. 8, 2018

(65) Prior Publication Data
US 2020/0377969 A1 Dec. 3, 2020

Related U.S. Application Data

(60) Provisional application No. 62/500,147, filed on May 2, 2017.

(51) Int. Cl.
*C22B 9/02* (2006.01)
*C22B 5/10* (2006.01)
(Continued)

(52) U.S. Cl.
CPC .............. *C22B 5/10* (2013.01); *C22B 3/04* (2013.01); *C22B 9/023* (2013.01); *C22C 35/005* (2013.01)

(58) Field of Classification Search
CPC .. C22B 5/10; C22B 3/04; C22B 9/023; C22C 35/005
See application file for complete search history.

(56) References Cited

U.S. PATENT DOCUMENTS 3,941,583 A 3/1976 Martin et al.
4,306,905 A * 12/1981 Pahlman ............... C22C 35/005
420/428
(Continued)

FOREIGN PATENT DOCUMENTS

CN 101280438 A 10/2008
WO 9004656 5/1990

OTHER PUBLICATIONS

PCT International Search Report and Written Opinion for International Application No. PCT/CA2017/050923, dated Jan. 19, 2018, 8 pages.
(Continued)

*Primary Examiner* — Scott R Kastler
(74) *Attorney, Agent, or Firm* — Hoffman Warnick LLC

(57) ABSTRACT

A direct reduction process for the production of ferrochrome from chromite ore or concentrate is disclosed. According to the present invention, calcium chloride ($CaCl_2$) is added as a catalyst to accelerate the solid reduction and enhance the particle growth of the metallic phase (i.e. ferrochrome) during reduction. The reduction of chromite ore or concentrate takes place at much lower temperatures (e.g. 1200 to 1400° C.) compared to the conventional smelting technologies, and the ferrochrome particles formed are segregated
(Continued)

from the unwanted residual gangue and spinel particles, facilitating their subsequent physical separation.

22 Claims, 9 Drawing Sheets

(51) Int. Cl.
*C22C 35/00* (2006.01)
*C22B 3/04* (2006.01)

(56) References Cited

U.S. PATENT DOCUMENTS

| | | | | |
|---|---|---|---|---|
| 4,601,752 | A * | 7/1986 | Santen | C22B 5/10 |
| | | | | 75/10.22 |
| 2019/0119784 | A1* | 4/2019 | Sokhanvaran | C22B 34/32 |

OTHER PUBLICATIONS

Zambrano et al., "Influence of the Binder on the Mechanical Properties of the Chromite Self-Reducing Pellets," International Journal of Business, Humanities and Technology, vol. 3 No. 8; Dec. 2013, 10 pages.
International Preliminary Report on Patentability for International Application No. PCT/CA2017/050923, dated Aug. 27, 2019, 11 pages.
European Patent Application Serial No. EP 17 90 8730, Supplemental Search Report dated Nov. 23, 2020, 10 pages.
Kleynhans, et al., "The Effect of Carbonaceous Reductant Selection on Chromite Pre-reduction," Metallurgical and Materials Transactions B, 48B: 827-840 (published online Dec. 27, 2016).

\* cited by examiner

CARBOTHERMIC DIRECT REDUCTION OF CHROMITE USING A CATALYST FOR THE PRODUCTION OF FERROCHROME ALLOY

FIELD OF THE INVENTION

The invention relates to the pyrometallurgical treatment of chromite ores or concentrates for the production of ferrochrome alloy.

BACKGROUND OF THE INVENTION

Ferrochrome is an essential alloy for stainless steel production. In Canada, the discovery of large chromite deposits in the Ring of Fire area in Northern Ontario has resulted in increased interests in the exploration of the deposits and its subsequent exploitation and processing to produce ferrochrome alloys.

Currently, most of the chromite ores or concentrates are processed by smelting with a reducing agent in electric arc furnaces to produce high-carbon ferrochrome or charge chrome. High-carbon ferrochrome contains typically 60-70 wt % of chromium, and 4-6 wt % of carbon, whereas charge chrome typically has chromium content of 50-55 wt % and carbon content of 6-8 wt %. These two types of ferrochrome are intermediate products primarily used for stainless steel production.

In a typical electric arc furnace smelting operation, electric current is passed through electrodes to generate heat and keep the temperatures sufficiently high to melt the feed materials and keep the slag in molten form. Endothermic reduction reactions take place by the addition of reductant to produce the molten ferrochrome alloy (Cr—Fe).

$$FeCr_2O_4 + 4C \rightarrow Cr_2Fe + 4CO$$

During the reduction process, MgO and $Al_2O_3$ are released from chromite to the molten slag phase. Molten alloy and molten slag phases in the electric arc furnace form two separate layers due to their immiscibility and substantial density difference. Separation of the molten alloy from the molten slag is then achieved by tapping them separately. Molten ferrochrome is tapped and casted in moulds, followed by crushing of the ingots to form a saleable ferrochrome product of different size fractions. An alternative product in the form of granulates is produced by water granulation of the molten ferrochrome.

There are certain drawbacks associated with conventional electric arc furnace smelting operation.

Among the drawbacks, conventional electric arc furnace smelting technologies for ferrochrome production are highly electrical energy intensive, mainly caused by the fact that smelting at temperatures as high as 1800° C. is required to keep the ferrochrome alloy and the slag phase molten during the reduction of chromite. Electrical energy consumption ranges from 2.4 to 4.3 MWh per tonne of ferrochrome produced. As a result, ferrochrome production is heavily constrained by the electrical power supply and the profitability of the smelting operation is greatly influenced by the local/regional price of electricity.

Therefore, efforts have been made to reduce the electrical energy consumption relating to conventional smelting technologies by incremental improvement, and by developing alternative processing routes for ferrochrome production.

For example, patent application WO 2015/060951 discloses a process wherein the chromite ore is reduced by reformed natural gas for reduction at sufficiently high temperatures. According to this application, fines of chromite are agglomerated with carbon and an accelerant (i.e. an alkaline compound in the form of an oxide, hydroxide or carbonate). The agglomerates, preferably in the form of pellets, are then reduced by reformed natural gas in a temperature range of 750 to 1150° C.

Patent application WO 2012/149635 discusses high temperature carbonaceous reduction of chromite ore with the usage of boron oxide ($B_2O_3$) or borate as a fluxing agent for the production of medium carbon ferrochrome. This application describes first making pellets from a mixture of chromite ore, coal and the above-mentioned catalyst; the pellets are then subjected to high temperatures of 1500° C. or lower, resulting in partial melting of the refractory oxides initiated by the flux followed by the reduction. The iron/chromium/residual carbon mixture is then further separated from the slag. Medium carbon ferrochrome alloy is produced by further melting the mixture in a melter.

Patent application WO 2008/142704 A1 discloses a process whereby chromite ore/concentrates are oxidized at a temperature of 900° C. to increase the reactivity of chromite, which, according to this application, is due to the formation of vacancies during the oxidation of FeO to $Fe_2O_3$. The oxidized ore/concentrates are further mixed with excess carbonaceous reductant and catalyst in the form of quartz ($SiO_2$) and lime (CaO) before pelletization. Reduction is carried out at 1400~1550° C., which supposedly would result in the formation of high-carbon ferrochrome nuggets with diameters measuring from 0.5 to 2.5 cm. This application claims that separation of the metal and slag phases can be achieved by physical methods and that a metallization degree of 50~70% can be achieved.

Patent application WO/2013/011521 discloses a method for direct reduction of oxidized chromite ore fines composite agglomerates in a tunnel kiln to produce a reduced product that can be used in ferrochrome or charge chrome production. According to this application, prior to agglomeration, the ground run of mine chromite ore fines are first heat-treated in a tunnel kiln or a rotary kiln at temperatures up to 1100° C. for a period of 30~300 minutes in the presence of air to allow the oxidation of FeO present in chromite spinel to form sequioxide lamellae on the surface of chromite particles. The oxidized chromite ore fines are then agglomerated with carbonaceous reductant, quartz or quartzite and lime as the slag formers and bentonite as the binder. The agglomerates are placed on the carbonaceous layer on the surface of tunnel kiln cars or trolleys, and subjected to reduction in the tunnel kiln, achieving metallization degrees of 15.0~75.0 wt % for Cr and 40.0~90.0 wt % for Fe. The reduced product or agglomerate can be used in ferrochrome or charge chrome production.

Patent GB1040443 describes a process for increasing the chromium-iron ratio of the chromite ore. According to this patent, the ore fines produced from grinding chromite ores or concentrates are mixed with ground carbonaceous reducing agent of up to 10 wt %, water, and a binding agent (e.g. sodium chloride, calcium chloride, sodium carbonate, or starch) before forming pellets. The proportion of the reducing agent is important so as to allow only reduction of the iron content while avoiding reduction of the chrome content. Partial reduction takes place by subjecting the pellets to a temperature of 1000~1450° C. for about 10 minutes. The reduced iron can subsequently be removed by leaching the roasted pellets with acid, producing the leached pellets having higher chromium to iron ratio than the original chromite ore or concentrate.

Notwithstanding the above improvements on conventional smelting technologies, there remains the need for effective and energy-efficient processes for the reduction of chromite to produce ferrochrome alloys.

SUMMARY OF THE INVENTION

The present invention discloses a novel process for the production of ferrochrome.

According to the present invention, the reduction of chromite takes place at much lower temperatures (e.g. 1200 to 1400° C.) than the current state of art, wherein the ferrochrome and unwanted residue produced are in their solid forms. Calcium chloride ($CaCl_2$) is added as a catalyst to accelerate the solid reduction and enhance particle growth of the metallic phase (i.e. ferrochrome) during reduction.

The catalyst calcium chloride ($CaCl_2 \cdot xH_2O$) can be in the form of anhydrous (x=0), hydrated (0<x≤6), or aqueous solution, depending on its water content.

According to the present application, it is directed to a process for production of ferrochrome alloy from chromite ore or concentrate, comprising:
(a) mixing the chromite ore or concentrate with carbonaceous reductant and calcium chloride to produce a feed material;
(b) drying said feed material to remove moisture;
(c) feeding the dried feed material into a reaction vessel at elevated temperatures for direct reduction of the chromite ore or concentrate in the dried feed material to produce a product mixture; and
(d) processing the product mixture to separate the ferrochrome alloy from the residual gangue and spinel.

Preferably, the chromite ore or concentrate is mixed with no less than stoichiometric amount of carbonaceous reductant, where stoichiometric amount of reductant is defined as the amount of carbon in the reductant required to complete reduction of chromium and iron oxides from the chromite ore or concentrate to form carbon monoxide, with extra carbon required to form alloy in its carbide form.

Preferably, the carbonaceous reductant is selected from the group consisting of graphite, coke, coal, char, and the like.

Preferably, the chromite ore or concentrate is in powder form.

Preferably, the calcium chloride is in the form of anhydrous, hydrated, aqueous solution, or a combination thereof, and more preferably the total mass of the calcium chloride is in the range of 10-35 wt % of the chromite ore.

Preferably, anhydrous or hydrated calcium chloride is in fine ground powder form.

Preferably, particle size of the chromite ore or concentrate is less than 48 mesh (Tyler).

Preferably, reductant with particle size fraction passing 100 mesh is used.

Preferably, after step (a), the feed material is agglomerated by pelletizing or briquetting to form pellets or briquettes, prior to step (b).

Preferably, in step (b) the feed material is dried at a temperature of 150° C. or higher.

Preferably, step (c) is performed in a shaft furnace, a multi hearth furnace, a tunnel kiln, a rotary kiln, or the alike, heated by burning fuels (e.g. coal, natural gas, etc.).

Preferably, in step (c) the elevated temperature is in the range of 1200° C. to 1400° C.

Preferably, reaction time of step (c) is 2 hours or less.

Preferably, in step (c) the product mixture comprises ferrochrome alloy, and residual gangue and spinel, the ferrochrome alloy are segregated from the residual gangue and spinel.

Preferably, the off-gas from step (c) comprises carbon monoxide, and further the carbon monoxide is processed by scrubbers and subsequently stored or combusted for heat recovery.

Preferably, the solid product from step (c) is further processed by leaching with water to recover calcium chloride, and the calcium chloride is re-generated through precipitation from the leachate, and subsequently recycled, which may be done by heating the leachate to supersaturate the calcium chloride through evaporation, wherein the heat required is produced by burning fuels or the CO-rich off-gas produced from step (c).

Preferably, there is a further step of breaking the solid product from step (c) by mild crushing.

Preferably, in step (d) the physical separation of the ferrochrome alloy from the unwanted materials is performed by gravity, sieving, magnetic separation techniques, or a nested combination of these techniques.

Other features and advantages of the present invention will become apparent from the following detailed description and the accompanying drawings, which illustrate, by way of example, the principles of the invention.

DETAILED DESCRIPTION OF THE INVENTION

The present invention addresses direct reduction of chromite using calcium chloride as catalyst for the production of ferrochrome alloy.

Figure 1:
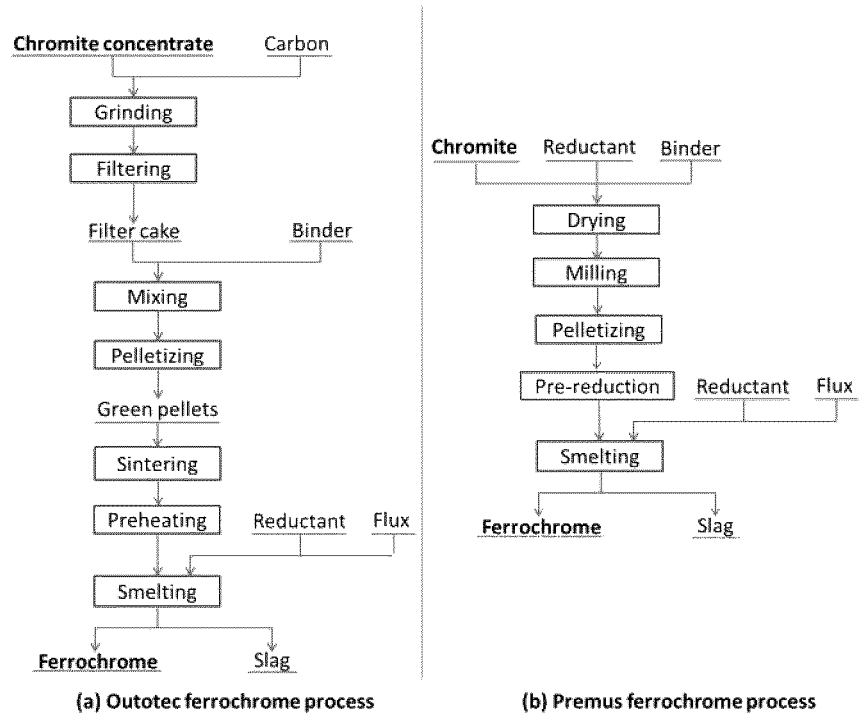
FIG. 1 includes flowcharts of two commercial smelting processes for ferrochrome production, namely, the Outotec and Premus ferrochrome processes.
Figure 2:
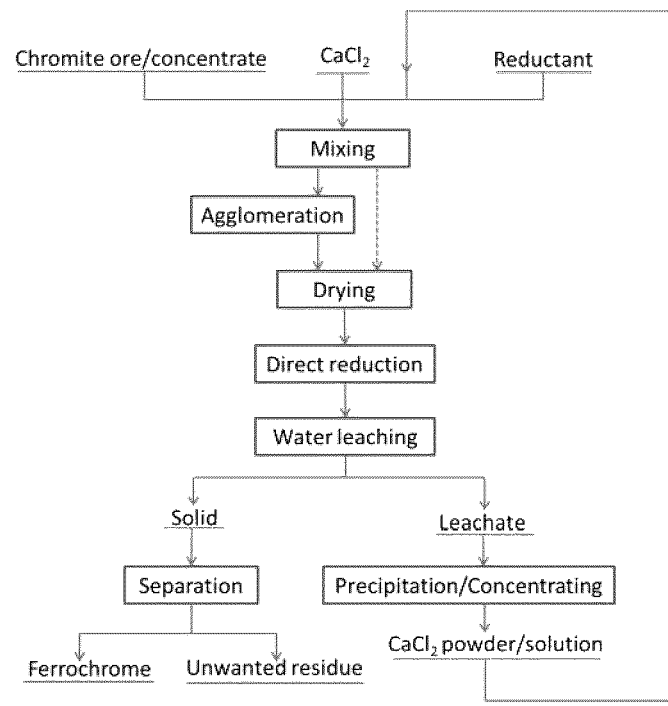
FIG. 2 is a flow chart of the direct reduction process for the production of ferrochrome from chromite ore/concentrate according to the present invention. Dashed line indicates that the agglomeration process is optional.

FIG. 1 includes flowcharts of two commercial smelting processes for ferrochrome production (i.e. Outotec and Premus ferrochrome processes), whereas FIG. 2 is a flowchart showing a direct reduction process for the production of ferrochrome from chromite ore/concentrate as disclosed according to the present invention.

As shown in FIG. 2, calcium chloride ($CaCl_2$) is added as a catalyst to accelerate the solid reduction and enhance the particle growth of the metallic phase (i.e. ferrochrome) during reduction. The reduction of chromite takes place at much lower temperatures (e.g. 1200 to 1400° C.) compared to the conventional smelting technologies, and the ferrochrome and unwanted residue produced are in their solid forms.

More specifically, the direct reduction process disclosed herein comprises the following steps:

(i) Mixing

After milling, chromite ores or concentrates in their powder form are first mixed with no less than the stoichiometric amount of carbonaceous reductant (e.g. graphite, coke, coal, or char, etc.), and $CaCl_2$. Stoichiometric amount of reductant is defined as the amount of carbon in the reductant required to reach complete reduction of chromium and iron oxides from the chromite ore/concentrate, forming carbon monoxide as the gaseous product, with the extra carbon required to form alloy in its carbide form, particularly $(Cr,Fe)_7C_3$.

Calcium chloride may be in the form of anhydrous, hydrated, aqueous solution, or any combination thereof, with the total mass of the catalyst (i.e. anhydrous $CaCl_2$) in the range of 10~35 wt % (dry weight) of the chromite ore/concentrate.

When calcium chloride is in solid form, it is preferable that calcium chloride is in fine ground powder form to ensure homogeneity during mixing with chromite and the carbonaceous reductant.

Control of particle sizes for both the chromite ore or concentrate and the reductant affects the kinetics of reduction and the particle sizes of the final ferrochrome alloy product.

Preferably, the particle size of the chromite ore or concentrate is less than 48 mesh (Tyler) as larger particle sizes will require longer retention times for reduction.

Preferably, reductant with particle size fraction passing 100 mesh is used, although a larger particle size range may also be used.

A person skilled in the art would appreciate that the amounts of carbonaceous reductant and $CaCl_2$ can be optimized for specific types of chromite ore/concentrate for improved metal recovery, lower amounts of reductant, and/or shorter retention times.

(ii) Agglomeration

To allow for easier handling of the powder feed while minimizing the dust generation during handling and subsequent processing, the mixture of chromite, reductant, and $CaCl_2$ is preferably agglomerated by pelletizing (e.g. disc or drum pelletizer) or briquetting to form pellets or briquettes for reduction.

The catalyst calcium chloride in the mixture tends to absorb moisture during mixing and pelletizing/briquetting, which acts as a binder and facilitates the pelletizing/briquetting process.

The agglomeration step is optional and does not exclude the feasibility of directly processing the mixture of chromite, carbonaceous reductant, and $CaCl_2$ without the agglomeration step, as indicated by the dashed line in FIG. 2.

(iii) Drying

The feed material to the drying process may be the green pellets/briquettes produced from the agglomeration step, or the mixtures produced from the mixing step in the case where agglomeration is not used.

Preferably, the feed material is dried at temperatures high enough (e.g. >150° C.) to remove moisture before direct reduction.

(iv) Direct Reduction

Preferably, the direct reduction of the feed is performed in a shaft furnace, a multi hearth furnace, a tunnel kiln, a rotary kiln, or the alike, heated by burning fuels (e.g. coal, natural gas, etc.), thus eliminating the need for electric energy. This however, does not exclude the use of an electrically heated furnace for reduction.

During operation, temperature of the feed is controlled, and preferably in the 1200° C. to 1400° C. range. A person skilled in the art would appreciate that temperatures higher than 1400° C. will result in a faster reduction rate, and shorter retention time for complete reduction, but at the cost of consuming more energy. Higher temperature could also potentially cause substantial evaporation of $CaCl_2$, which could be entrained in the off-gas, or deposited onto the cooler region of the furnace chamber.

The time required for near-complete reduction is generally less than 2 hours, but depends upon factors such as temperature, and the particle sizes of chromite and reductant.

The off-gas from the direct reduction process is rich in CO, which is then processed by scrubbers and subsequently stored or combusted for heat recovery. For example, the heat generated from CO combustion is further used for drying and preheating the feed before direct reduction, thereby further reducing the energy consumption. The CO-rich off-gas could also be used for generating electricity.

Figure 3:
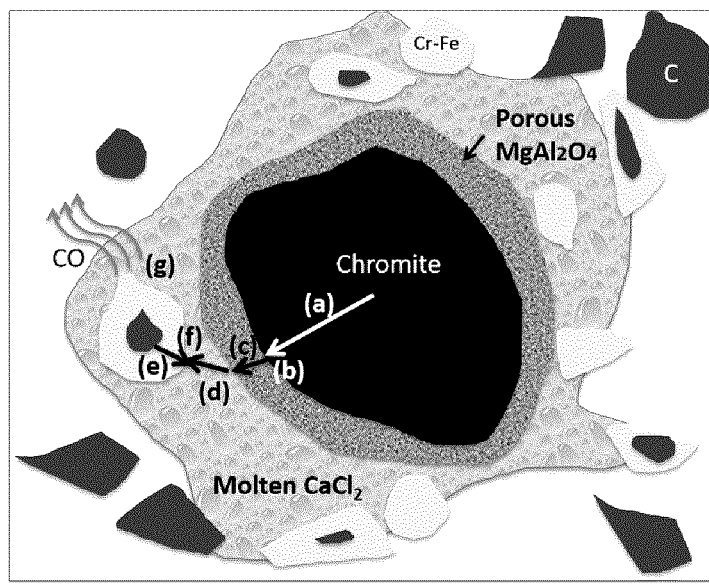
FIG. 3 illustrates schematically the role of $CaCl_2$ in the reduction process according to the present invention.

FIG. 3 further illustrates schematically the role of $CaCl_2$ in the reduction process where steps (a) to (g) represent the following:
(a) in-situ reduction of $Fe^{3+}$ and diffusion of reducible ions (e.g. $Fe^{2+}$, $Fe^{3+}$, $Cr^{3+}$) to chromite particle surfaces;
(b) incongruent dissolution of chromite (shrinking core) resulting in the release of Cr and Fe ions to molten $CaCl_2$ and formation of porous spinel ($MgAl_2O_4$);
(c) mass transfer of dissolved ions through the porous spinel product layer;
(d) mass transfer of dissolved ions through the molten $CaCl_2$ to the surface of metallic particles (initially carbonaceous particles);
(e) outward transfer of C from the shrinking core of the carbonaceous particle through the metallic layer;
(f) reduction on metallic surface; and
(g) release of CO gas through the pores of the feed.

Describing the process in more detail, catalyst $CaCl_2$ in the feed melts when the temperature is above approximately 800° C., and creates a liquid media to enable incongruent dissolution of chromite and transport of reducible ions (e.g. $Fe^{2+}$, $Fe^{3+}$, $Cr^{3+}$) from chromite to carbonaceous reductant particles where metallization takes place. Transport of the Cr and Fe species can also occur in the gas phase as ionic species. Metallization starts with the nucleation and growth of the metallic phase on the carbonaceous reductant particles. The gaseous product from the direct reduction (i.e. CO) escapes or is released through pores of the feed. Due to the closely packed nature of the particles in the feed, adjacent ferrochrome particles coalesce. This facilitates the growth of ferrochrome particles and the subsequent separation of ferrochrome particles from the unwanted gangue and spinel materials.

(v) Water Leaching

The solid product from direct reduction is processed, for example, it is quenched in water, and leached for the recovery of $CaCl_2$ by taking advantage of the highly water-soluble nature of $CaCl_2$. The product disintegrates during leaching due to the thermal shock occurred during quenching, and during the removal and dissolution of $CaCl_2$ by leaching.

$CaCl_2$ recovered from the leaching process will be re-used. Because $CaCl_2$ does not participate in the reduction reactions in the high temperature direct reduction process, it will be mostly recovered and recycled, thus minimizing the material costs. The recovery of $CaCl_2$ by water leaching is around 95 by wt %.

(vi) Precipitation/Concentrating

The $CaCl_2$ catalyst is re-generated through precipitation from the leachate, and subsequently recycled for mixing with chromite ore/concentrate and reductant. This is performed by heating/boiling to supersaturate the solution with respect to $CaCl_2$ through evaporation.

The heat required may be produced by burning fuels or the CO-rich off-gas produced from the direct reduction process. For example, the amount of heat generated from burning the CO-rich off-gas is sufficient for the complete precipitation of $CaCl_2$ from leachate based on thermal balance calculations.

An alternative to precipitation is to produce concentrated $CaCl_2$ solution by boiling off excess water from the leachate. The concentrated $CaCl_2$ solution is then recycled and sprayed and mixed with the chromite ore/concentrate and reductant.

This re-generation of $CaCl_2$ substantially minimizes the overall consumption of $CaCl_2$ per tonne of ferrochrome produced.

(vii) Separation

To enable sufficient liberation of the ferrochrome alloy particles following leaching by water, mild crushing may be required.

Subsequent separation of ferrochrome alloy from the residual gangue and refractory spinel particles is possible considering the following factors:
(1) During reduction, the molten $CaCl_2$ facilitates the transport of Cr and Fe ions to the carbonaceous reductant and growth of ferrochrome alloy particles, effectively "liberating" the alloy from the residual refractory spinel particles;
(2) Density, particle size and magnetic property of the ferrochrome alloy make its physical separation from the slag and residual spinel possible by gravity, sieving, or magnetic separation techniques, etc.

A nested combination of these techniques may be utilized to make the physical separation more efficient.

The process as described above for the direct reduction of chromite for ferrochrome production differs from the conventional processes and provides, inter alia, the following advantages:
a. More energy efficient: complete reduction of chromite takes place at much lower temperatures compared to the conventional electric arc furnace smelting process where excess energy is required not only to heat the feed materials to a much higher temperature, but also to melt the ferrochrome alloy and the slag in the furnace for separation.
b. The present process also eliminates the conventional processes' heavy dependency on electricity as the main energy source. The present process can rely solely on combustion heat from burning fuels, drastically lowering the energy costs of the ferrochrome production, and making it economically more feasible to build a processing plant in areas/regions where electricity is expensive. This especially applies to places where electricity rates are expensive and natural gas pipelines are accessible (for example, in Northern Ontario) as a cheaper alternate energy source. In addition, the present invention reduces greenhouse gas emissions.
c. The use of $CaCl_2$ as a catalyst makes the present direct reduction process feasible by greatly accelerating the reduction process through the generation of a molten media as discussed above.
d. High degree of metallization (e.g. 98 wt % Cr, 100 wt % Fe) is achieved using the present direct reduction process within a period of 2 hours.
e. The use of $CaCl_2$ in the reduction process facilitates the formation of alloys that are easily separated from the unwanted materials.
f. Particle size distribution of the ferrochrome produced is partially controlled by the particle size range of the carbonaceous reductant used for reduction. Therefore, when there is a substantial particle size difference between the chromite ore/concentrate and the carbonaceous reductant, effective separation of the ferrochrome from unwanted gangue and spinel is achieved by using a simple and cost-effective sieving method.

g. The water-soluble nature of $CaCl_2$ makes it easy for its recovery from the reduced product by leaching with water, thus substantially lowering the materials cost through its recycling.

h. The present process eliminates the need for molten metal/slag handling, casting, ingot crushing and slag granulation, all of which contributes to higher production costs.

EXAMPLES

High temperature reduction tests were conducted using a vertical electrical tube furnace. For each test, the sample was loaded in an alumina crucible and then placed inside the sealed alumina tube of the electric furnace. During heating, the chamber of alumina tube was continuously purged with a controlled flow of Ar to maintain an inert atmosphere. Off-gas was analyzed continuously with a gas analyzer for its CO and $CO_2$ concentrations. The results from the off-gas analysis were recorded by a data acquisition system.

Sample Characterization

Products from the furnace reduction tests were subjected to characterization, such as optical microscopy, scanning electron microscopy with energy dispersive spectrometry (SEM/EDS), and X-ray powder diffraction (XRD).

Method for Determining the Degree of Metallization

Degrees of metallization for both Fe and Cr were assessed by an acid selective catalyst leaching method accepted and used by industrial smelters as well as researchers in the same field. Using this method, the metallic phases that formed in the products are dissolved selectively by the acid, leaving behind the oxides in the solid residue. Solid residue was further completely dissolved into an aqueous solution using $Na_2O_2$ fusion technique. Solutions from both leaching and fusion were analyzed by inductively coupled plasma optical emission spectrometry (ICP-OES) for their chemical composition to determine the degree of metallization.

Recovery of $CaCl_2$

Recovery of $CaCl_2$ from the products by water leaching is an important aspect of the proposed direct reduction process. This was performed by leaching with boiling water for 30 minutes. The degree of $CaCl_2$ recovery is calculated from the $CaCl_2$ contents of the leachate and residue.

Magnetic Separation

After water leaching, some of the products were subjected to magnetic separation using the Frantz magnetic separator. The magnetic and non-magnetic parts were analyzed by SEM/EDS to assess the separation performance.

Example 1

As a control experiment, no $CaCl_2$ was added to the sample in this test. The chemical composition of the chromite concentrate used in this example is shown in Table 1 below.

TABLE 1

Composition of the chromite concentrate in Example 1

| $Cr_2O_3$ | FeO | MgO | $Al_2O_3$ | $SiO_2$ | CaO | $TiO_2$ | $V_2O_5$ |
|---|---|---|---|---|---|---|---|
| 46.4 | 21.0 | 10.8 | 12.8 | 3.5 | 0.3 | 0.5 | 0.2 |

Figure 4:
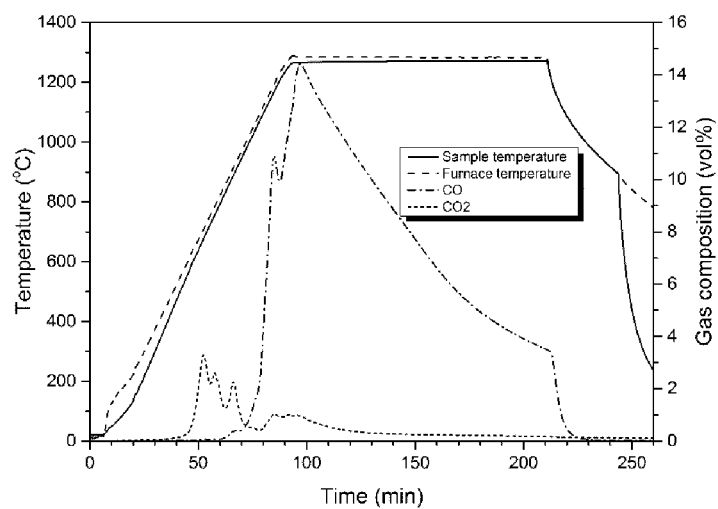
FIG. 4 is a graph of the temperature profile, CO and $CO_2$ concentrations in the off-gas for the test conducted on Example 1 with no $CaCl_2$ addition according to the present invention.

Chromite concentrate having the size range of 150~200 mesh was firstly mixed thoroughly with 30 wt % graphite powders (400~500 mesh) before pelletization. Pelletized samples were heated in an inert argon atmosphere at 1300° C. for two hours as shown in FIG. 4. Reduction of the chromite by graphite took place resulting in the formation of CO and $CO_2$ as the gaseous product.

In FIG. 4, concentrations of CO and $CO_2$ in the off-gas reflect the rate of reduction. Reduction reactions started to take place at approximately 500° C., resulting in the formation of $CO_2$. Higher temperature resulted in the evolution of CO as the main gaseous product, reaching a peak of about 15 vol %. At the end of the two-hour dwelling at 1300° C., there was still approximately 4 vol % CO evolution, an indication that the reduction was still far from reaching completion. This was confirmed by scanning electron microscopy (SEM) and energy dispersive spectroscopy (EDS) analyses on the sample product.

Example 2

In contrast to the control test, per 100 g of chromite concentrate, 30 g of graphite powder having a size range of 400~500 mesh and 30 g of finely ground $CaCl_2$ was added and mixed before pelletization. The green pellets were heated in an inert atmosphere at 1300° C. for 2 hours before cooling down.

Figure 5:
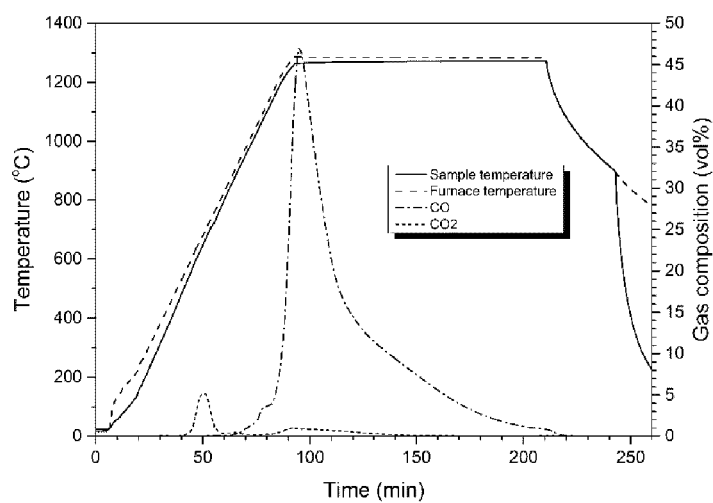
FIG. 5 is a graph of the temperature profile, CO and $CO_2$ concentrations in the off-gas for the test conducted on Example 2 according to the present invention.

Compared to the control test of Example 1, much higher evolution of CO took place in Example 2. As shown in FIG. 5, the CO peak reached as high as 47 vol %, evidence that much accelerated reduction reactions took place due to the presence of $CaCl_2$.

The reduced pellets were subjected to further characterization. Based on the examination of the reduced product, metallization degrees of 98.29 wt % Cr and 99.97 wt % Fe were achieved during direct reduction.

Figure 6:
FIG. 6 shows SEM images of ferrochrome alloy (white) and unwanted (grey) particles formed from direct reduction process for the test conducted on Example 2 according to the present invention.

FIG. 6 is a photomicrograph of the cross section of the reduced pellets taken by SEM, showing the particle size and morphologies of the ferrochrome alloy (white) and the residual refractory spinel (grey) particles formed during reduction. SEM observations indicate partial sintering of adjacent alloy particles. This sintering and growth of alloy particles facilitate physical separation of ferrochrome from the unwanted materials. The porous grey particles were composed mainly of spinel ($MgAl_2O_4$) and forsterite ($Mg_2SiO_4$) that are devoid of alloy particles as micro inclusions. This feature ensures maximum separation of ferrochrome alloy from unwanted materials without the need of further grinding.

Water-leach tests were performed on the reduced pellets, resulting in a recovery of 97.54 wt % $CaCl_2$ into the leachate, showing the feasibility of recovering the $CaCl_2$ for reuse, thus further lowering the material cost.

Figure 7:
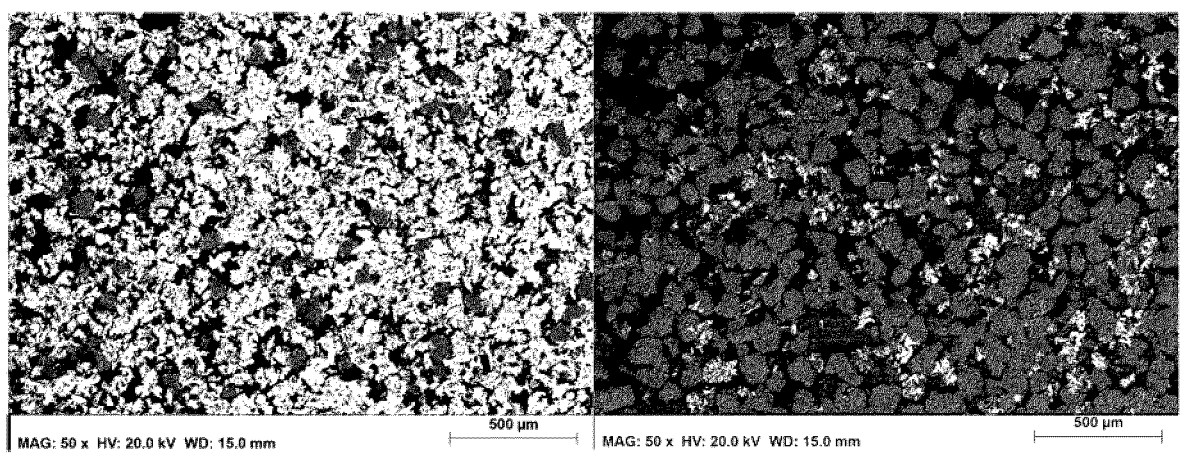
FIG. 7 shows SEM images of magnetic (left) and non-magnetic (right) fractions after single-stage magnetic separation of the reduced product for the test conducted on Example 2 according to the present invention.

The reduced product after water-leach was subjected to a single-stage magnetic separation. FIG. 7 shows the morphologies of the magnetic (left) and non-magnetic (right) fractions of the product following magnetic separation. As illustrated, a significant proportion of the gangue particles reported to the non-magnetic fraction, evidence of the feasibility and the effectiveness of the magnetic separation. Recovery of the ferrochrome is increased by multi-stage magnetic separation or by combining with other separation methods.

Example 3

Charcoal having particle sizes in the range of 150~200 mesh was used as the carbonaceous reductant in this example. Chromite concentrate of 150~200 mesh was mixed with 22 wt % charcoal and 30 wt % $CaCl_2$ before pelletization. The green pellets were subjected to drying at 300° C.

for one hour followed by heating at 1300° C. for two hours in the furnace before cooling to room temperature.

Subsequently, the reduced pellets were leached with water for the recovery of $CaCl_2$. During leaching, the pellets collapsed to powders partially due to the removal of $CaCl_2$ by dissolution, and by crushing them gently.

Figure 8:
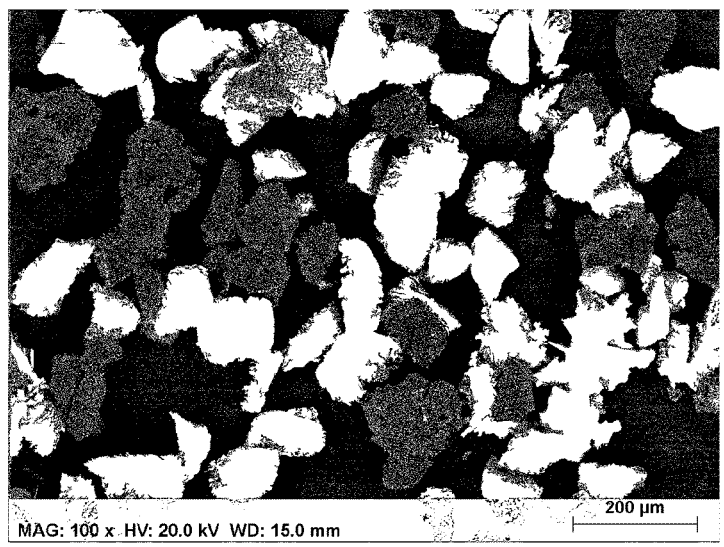
FIG. 8 shows SEM image of ferrochrome alloy (white) and the residual gangue and spinel (grey) particles resulting from direct reduction process for the test conducted on Example 3 according to the present invention.

FIG. 8 shows the surface morphology of the dried powders after water leaching. Relatively clean ferrochrome alloy particles are observed, evidence that a near-complete liberation of the ferrochrome alloy particles from the reduced chromite and other unwanted particles. Because the charcoal used in this example was porous, the ferrochrome alloy particles formed were also porous resulting from the distinct reduction mechanism as discussed previously and shown in FIG. 3, step d.

Figure 9:
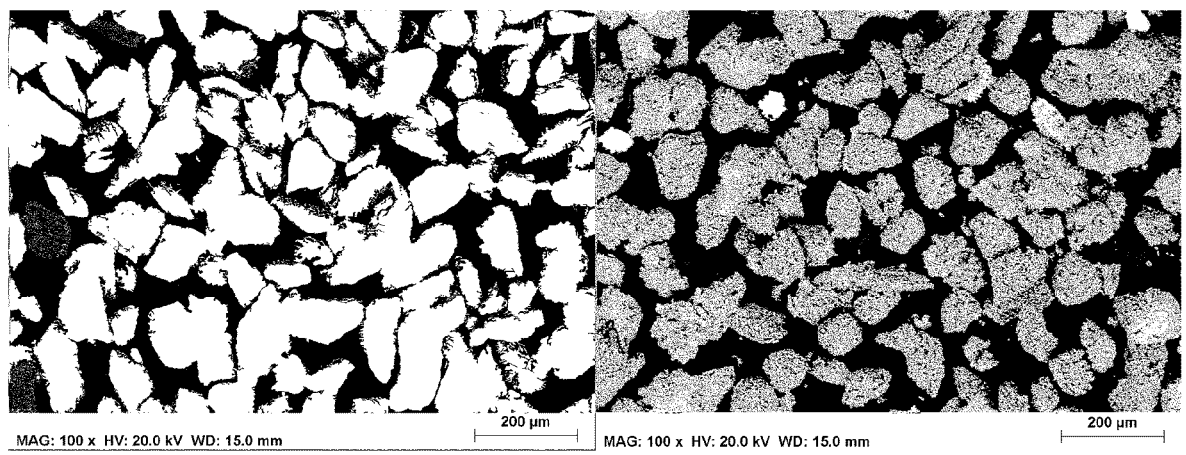
FIG. 9 shows SEM images of ferrochrome alloy particles (left) and the residual gangue and spinel particles (right) produced from magnetic separation process for the test conducted on Example 3 according to the present invention.

A multi-step magnetic separation test using various magnetic intensities was performed on the dried powders. FIG. 9 shows the magnetic and non-magnetic products from one magnetic separation test. The magnetic portion (left) is composed of ferrochrome alloy particles with very few slag and/or residual chromite/spinel inclusions. Residual spinel particles with very low contents of Cr and Fe along with other unwanted components form the non-magnetic portion (right).

Example 4

Chromite concentrate having particle sizes in the 200 to about 400 mesh range was first mixed with 22 wt % flake-shaped graphite (100~150 mesh) and 30 wt % ground $CaCl_2$ powder. The mixture was subjected to pelletization to form green pellets. The green pellets were heated at 300° C. to reduce its water content before heating at 1300° C. for two hours in an inert atmosphere for direct reduction.

After the reduced pellets cooled down to room temperature, a reduced pellet was sectioned to prepare a polished section for characterization using SEM.

Figure 10:
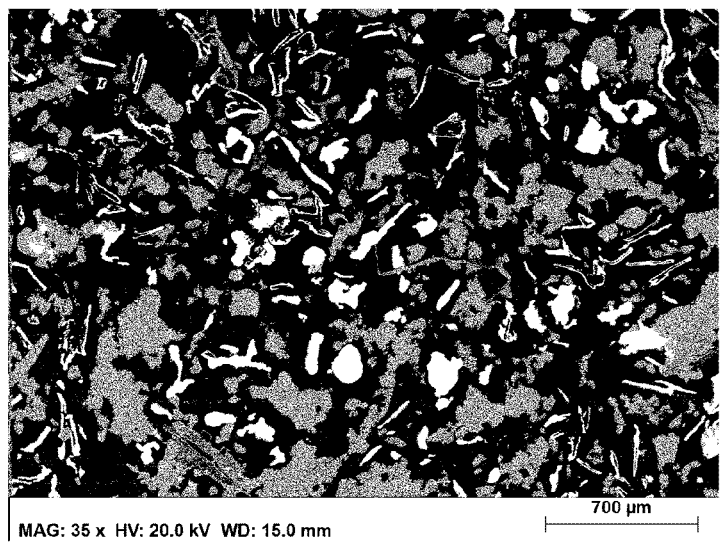
FIG. 10 shows SEM image of a cross section of the reduced pellet for the test conducted on Example 4 according to the present invention.

FIG. 10 shows the cross section of the reduced pellet. The white particles are ferrochrome alloy particles, and the grey particles are the residual chromite/spinel particles with $CaCl_2$. The residual chromite/spinel particles have an average Cr concentration of about 1 wt %, evidence of a high degree of reduction. Most of the ferrochrome particles are not physically associated with the residual chromite/spinel and slag particles, evidence of a high degree of liberation.

The reduced pellets were leached with water to recover $CaCl_2$. The pellets disintegrated during leaching and by mild crushing in water. Grinding was not necessary and should be avoided to minimize the formation of extra fine particles.

Because the particle size of graphite was larger than that of chromite in the green pellets, a preliminary separation of the ferrochrome particles from the gangue materials was performed by wet-sieving to reject a significant portion of the unwanted material.

Figure 11:
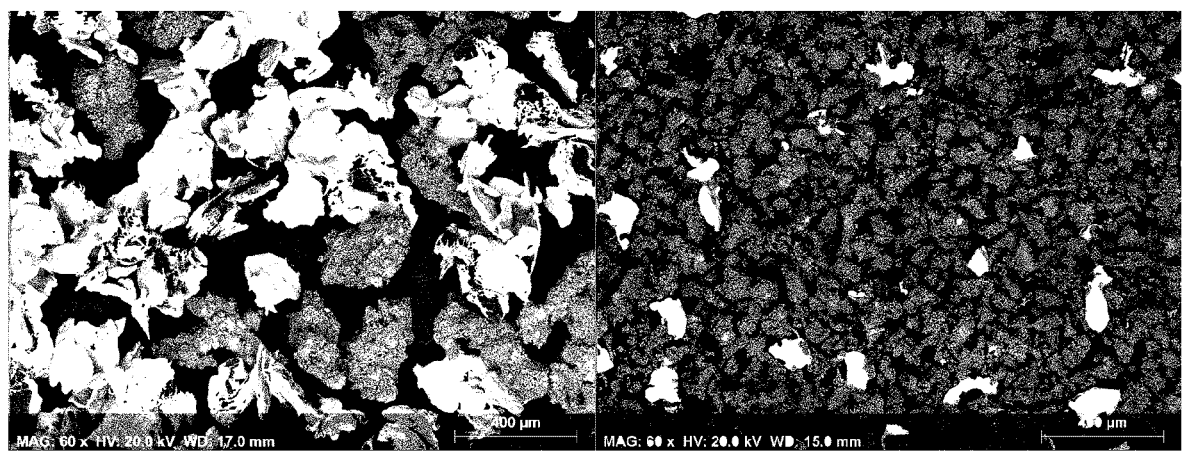
FIG. 11 shows SEM images of the oversize (left) and the undersize products (right) from the wet-sieving process using 170 mesh sieve for the test conducted on Example 4 according to the present invention.

FIG. 11 illustrates the oversize and the undersize products from the wet-sieving process using 170 mesh sieve. The undersize particles are mainly unwanted materials, evidence of the effectiveness of the wet-sieving technique to reject the unwanted materials. The unwanted material in the oversize fraction formed during direct reduction when local sintering took place among adjacent chromite particles, resulting in an increase of the residual chromite particle size. The presence of siliceous gangue in the chromite ore/concentrate was likely the cause of local sintering. Thus, separation by wet-sieving would be more effective when dealing with chromite ores/concentrates having lower contents of the siliceous gangue in the feed.

Figure 12:
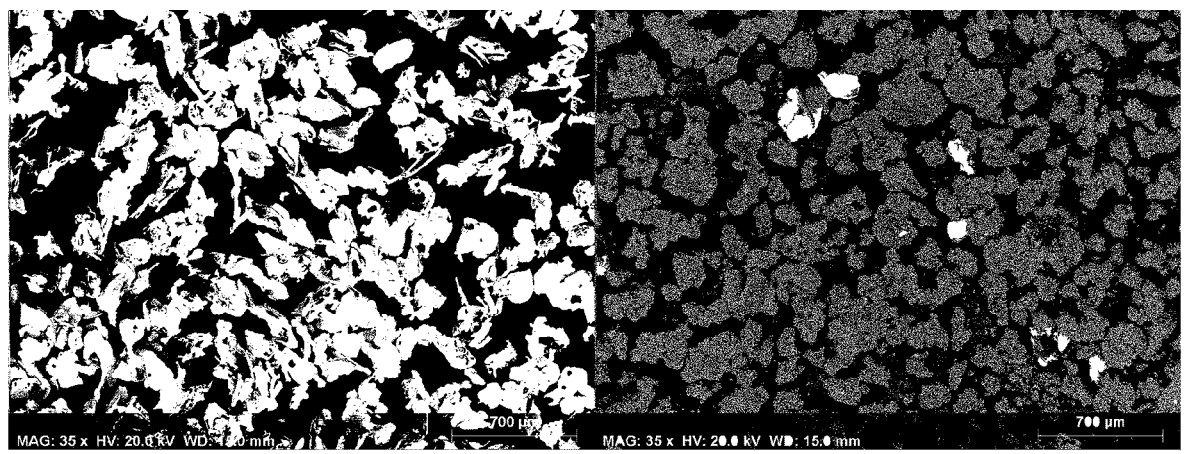
FIG. 12 shows SEM images of the magnetic fraction (the ferrochrome product) and the non-magnetic fraction from magnetic separation of the oversize product for the test conducted on Example 4 according to present invention.

Magnetic separation was performed on the oversize product. FIG. 12 shows the magnetic fraction which is the ferrochrome product and the non-magnetic fraction from magnetic separation, evidence of the feasibility to achieve a high degree of separation of the ferrochrome product from the unwanted materials.

Example 5

Chromite concentrate (150~200 mesh) was mixed with 22 wt % flake-shaped graphite powders (150~200 mesh) and 30 wt % $CaCl_2$ powders. A briquette measuring a thickness of about 3 cm was made by mixing the powder mixture with water followed by drying in an oven at 150° C. The briquette was subjected to heating at 1300° C. for two hours in an inert atmosphere before cooling down to room temperature.

Figure 13:
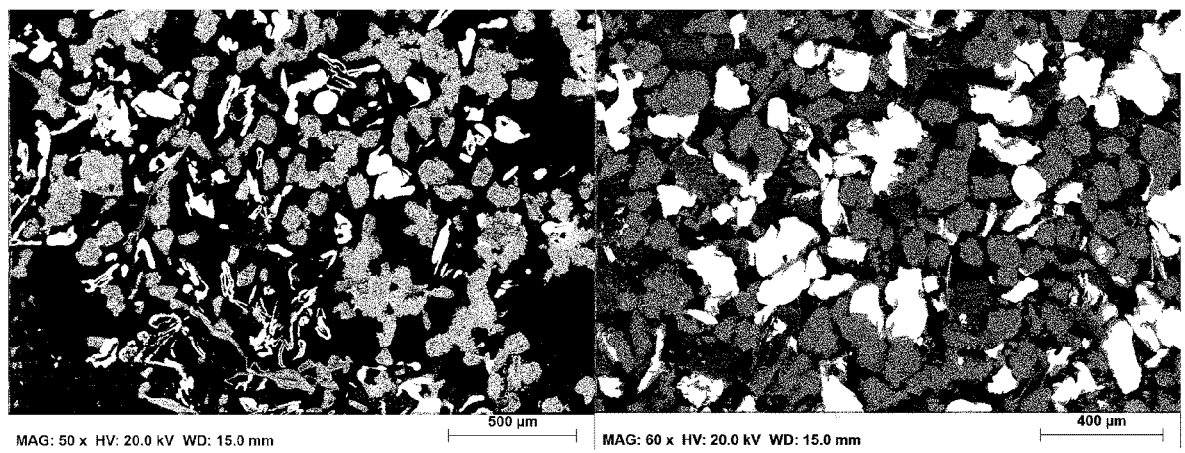
FIG. 13 shows SEM images of the cross section of the reduced pellet (left) and the surface morphology of the reduced powders after water leaching (right) for the test conducted on Example 5 according to present invention.

FIG. 13 shows the cross section of the reduced briquette (left) and the surface morphology of the powders produced from water leaching of the reduced briquette (right). The residual chromite/spinel particles (grey) have an average Cr concentration of less than 1 wt %, evidence of high degree of reduction has taken place during the direct reduction. Very few ferrochrome alloy particles (white) are physically associated with the residual gangue and spinel particles, which means that grinding would not be needed before the separation process.

Figure 14:
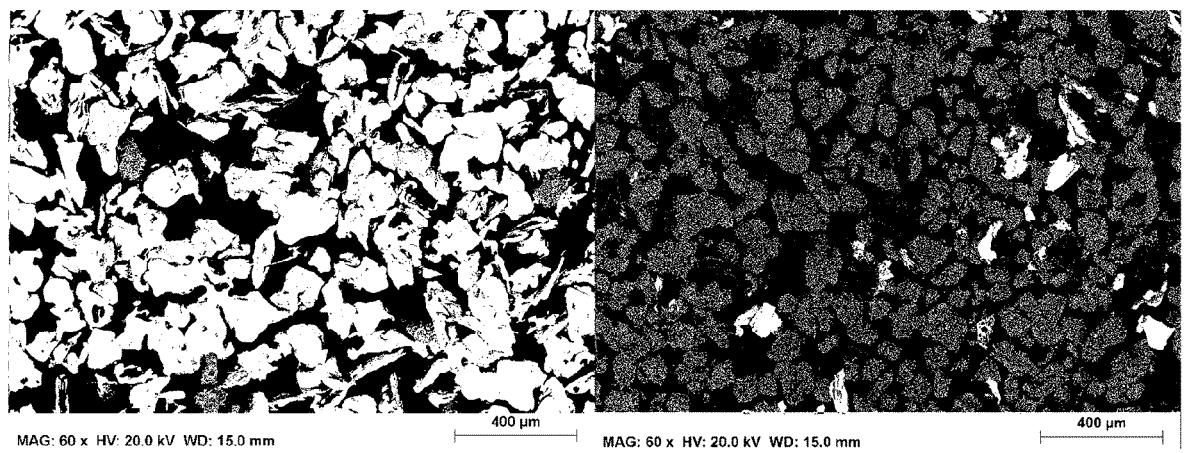
FIG. 14 shows SEM images of magnetic fraction dominated by the ferrochrome alloy particles (left) and the non-magnetic fraction composed largely of unwanted particles (right) that resulted from magnetic separation process for the test conducted on Example 5 according to present invention.

A multi-step magnetic separation test using various magnetic intensities was performed on the dried powders. FIG. 14 shows the magnetic and non-magnetic fractions from one magnetic separation test. The magnetic fraction (left) is composed of ferrochrome alloy particles with a few residual gangue and spinel inclusions. The residual chromite particles with low content of Cr and Fe along with other unwanted materials form the non-magnetic fraction (right).

Example 6

Chromite concentrate (200~400 mesh) was mixed with 22 wt % graphite (100~150 mesh) and 30 wt % $CaCl_2$ powders. Without agglomeration, the powder mixture was directly charged into the furnace for drying and reduction. Drying took place at 300° C. for one hour. Subsequently, the mixture was further heated at 1300° C. for two hours before cooling down to room temperature.

Figure 15:
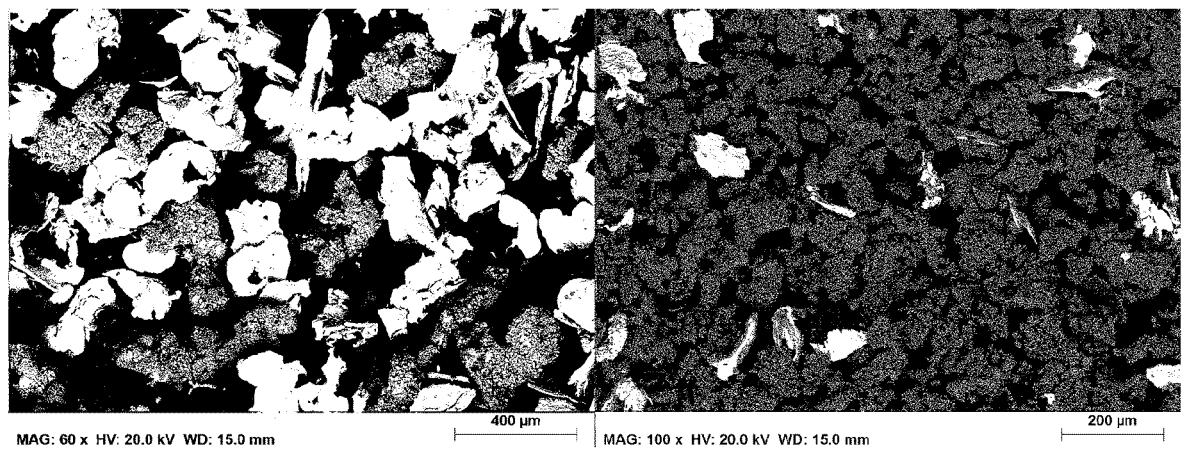
FIG. 15 shows SEM images of oversize (left) and undersize (right) portions from wet-sieving the reduced product for the test conducted on Example 6 according to present invention.

After water leaching, the reduced product was wet-sieved using a sieve of 170 mesh. FIG. 15 illustrates the oversize (left) and the undersize (right) fractions, evidence of the effectiveness of wet-sieving for rejecting the unwanted particles as the undersize portion. Further physical separation is performed on the oversize fraction using other separation techniques (e.g. magnetic separation). SEM analysis shows that there is, on average, 1.8 wt % Cr in the residual chromite particles, evidence of a high degree of reduction.

Figure 16:
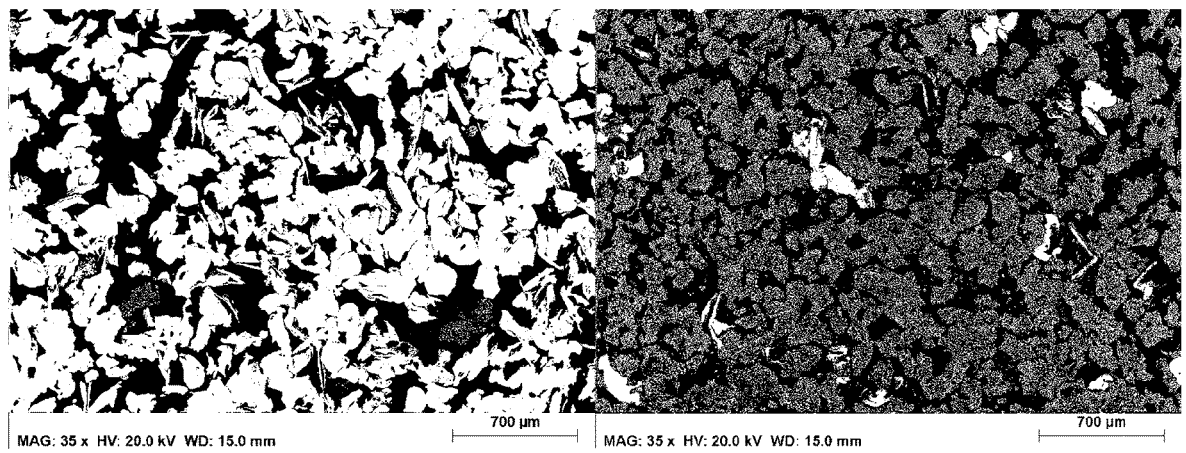
FIG. 16 shows SEM images of ferrochrome alloy particles (left) and the unwanted fraction (right) produced by magnetic separation of the oversize product for the test conducted on Example 6 according to present invention.

Magnetic separation was further performed on the oversize product. FIG. 16 shows the magnetic ferrochrome product (left) and the unwanted particles in the non-magnetic fraction (right) produced from magnetic separation, evidence of the feasibility of achieving a high degree of separation of the ferrochrome product from the unwanted materials.

Example 7

Chromite concentrate of 200~400 mesh was mixed with 30 wt % graphite powder (400~500 mesh), and 20 wt %

CaCl₂ without pelletization. Sample powder mixture was heated at 1300° C. for two hours (FIG. 17).

Figure 17:
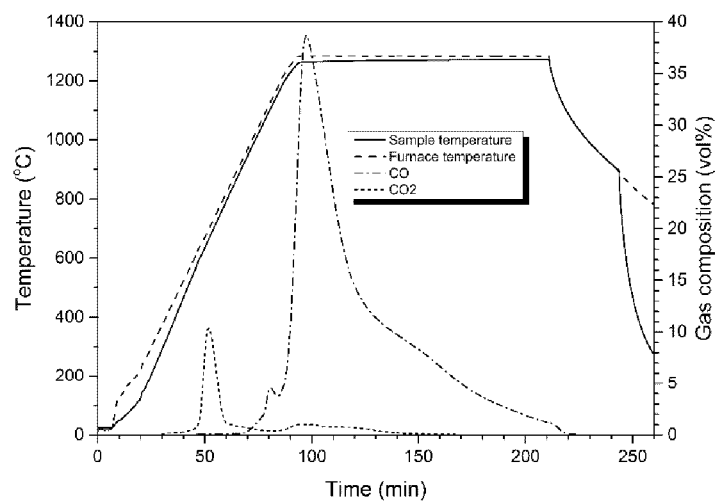
FIG. 17 is a graph of the temperature profile, CO and $CO_2$ concentrations in the off-gas for the test conducted on Example 7 according to present invention.

When compared with Example 1, the reduction rate was also much higher due to the presence of CaCl₂ even without pelletization, as can be seen from FIG. 17.

94.7 wt % of CaCl₂ in the product was recovered by water leaching. From the analysis by selective acid leaching, metallization degrees of 97.5 wt % Cr and 100.0 wt % Fe were achieved, evidence of complete reduction within a period of two hours at 1300° C.

Example 8

Figure 18:
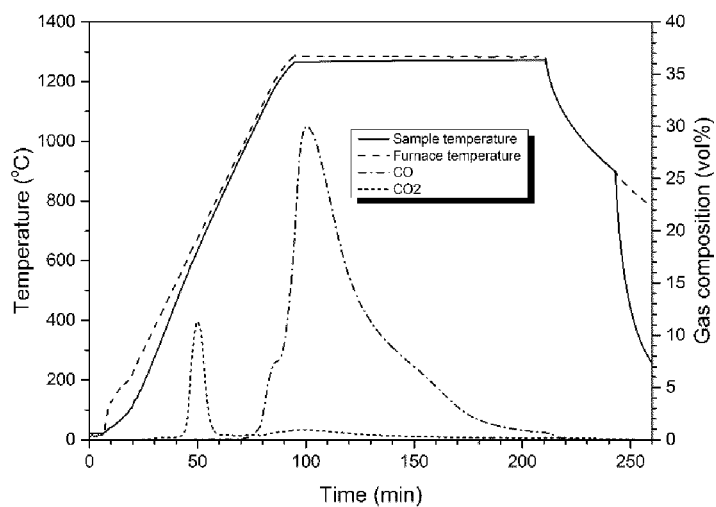
FIG. 18 is a graph of the temperature profile, CO and $CO_2$ concentrations in the off-gas for the test conducted on Example 8 according to present invention.

Chromite concentrate of passing 400 mesh (<38 pm) was mixed with 30 wt % graphite powders (200~325 mesh) and 20 wt % CaCl₂ without making pellets. Sample mixture was subjected to 1300° C. for two hours. As can be seen from FIG. 18, the reduction rate was relatively high.

The concentration of CO in the off-gas decreased to about 1 vol % before cooling down, evidence of a near complete reduction. Metallization degrees of 92.0 wt % Cr and 94.1 wt % Fe were achieved. 84.3 wt % CaCl₂ was recovered based on water leaching test.

Sample product was analyzed by SEM which suggests that the particle size of the ferrochrome alloy particles can be greatly influenced by the starting graphite particle size.

Example 9

Chromite concentrate of 200~400 mesh was mixed thoroughly with 30 wt % graphite powder (400~500 mesh) and 20 wt % CaCl₂ before pelletization. Sample pellets were heated at 1300° C. for two hours.

Figure 19:
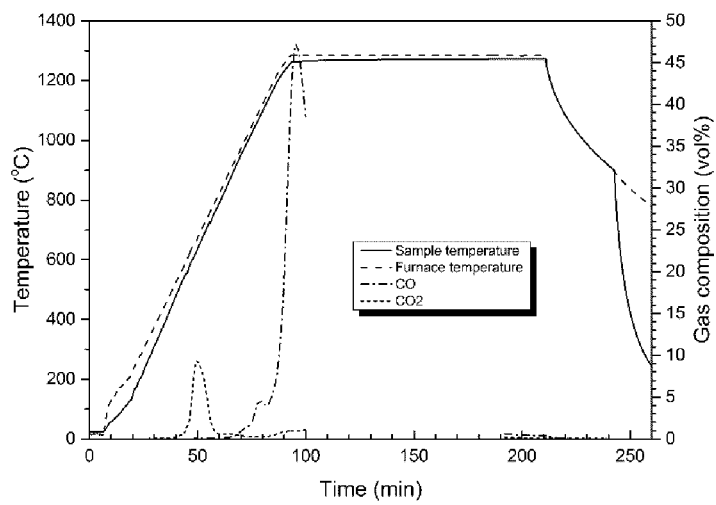
FIG. 19 is a graph of the temperature profile, CO and $CO_2$ concentrations in the off-gas for the test conducted on Example 9 according to present invention.

Concentrations of CO and CO₂ in the off-gas were plotted in FIG. 19 along with the temperature profile, as a function of time. The results for the off gas analysis after 100 min was not shown here due to abnormalities that took place in the off gas measurement. In terms of the experimental conditions, the only difference between Example 9 and Example 7 is that sample mixture was pelletized in Example 9.

By comparing their results from the off-gas analysis, the CO peak reached a much higher concentration at about 47 vol % for the reduction test on pelletized samples (FIG. 19), meaning pelletization is beneficial in terms of further accelerating the reduction.

High metallization degrees of 98.5 wt % Cr and 100.0 wt % Fe were achieved in this test. 92.3 wt % of CaCl₂ was recovered based on water leaching test.

Example 10

Chromite concentrate of 150~200 mesh was mixed with 30 wt % graphite powder (400~500 mesh) and 20 wt % CaCl₂ before pelletization. Sample pellets were heated at 1300° C. for two hours.

Figure 20:
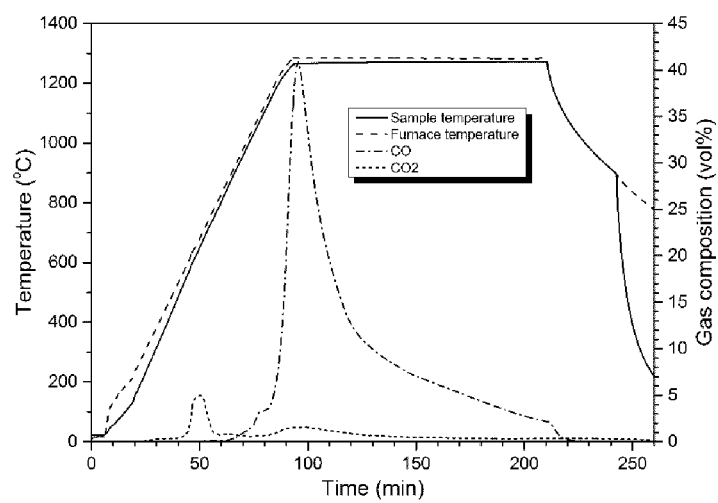
FIG. 20 is a graph of the temperature profile, CO and $CO_2$ concentrations in the off-gas for the test conducted on Example 10 according to present invention.

The results from off-gas analysis along with the temperature profile are shown in FIG. 20. Based on the CO concentration, the reduction took place at a relatively fast rate because of the addition of CaCl₂ when compared with Example 1 control test, confirming the effectiveness of CaCl₂ in accelerating the direct reduction of chromite.

Metallization degrees of 74.7 wt % Cr and 77.0 wt % Fe were achieved, which were relatively low compared with other tests with CaCl₂ addition. 96.0 wt % of CaCl₂ is recovered by water leaching.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

The invention claimed is:

1. A process for production of a ferrochrome alloy from a chromite ore or a chromite concentrate, comprising:
    (a) mixing the chromite ore or the chromite concentrate with a carbonaceous reductant and calcium chloride to produce a feed material, wherein the total mass of the calcium chloride is in the a range of 10-35 wt % of the chromite ore or the chromite concentrate;
    (b) drying said feed material at a temperature of 150-300° C. to remove moisture;
    (c) feeding the dried feed material into a reaction vessel at an elevated temperature for a direct reduction of the chromite ore or the chromite concentrate in the dried feed material to produce a product mixture comprising an off-gas and a solid product; and
    (d) processing the product mixture to separate the ferrochrome alloy from residual gangue and spinel,
    wherein in step (c) the elevated temperature is above 1200° C.

2. The process according to claim 1, wherein the chromite ore or the chromite concentrate is mixed with no less than a stoichiometric amount of the carbonaceous reductant.

3. The process according to claim 2, wherein the stoichiometric amount of the carbonaceous reductant is the amount of carbon in the carbonaceous reductant required to complete reduction of chromium and iron oxides from the chromite ore or the chromite concentrate to form carbon monoxide, with extra carbon required to form alloy in its carbide form.

4. The process according to claim 1, wherein the carbonaceous reductant comprises graphite, coke, coal, or char.

5. The process according to claim 1, wherein the chromite ore or the chromite concentrate is in powder form.

6. The process according to claim 1, wherein the calcium chloride is in a form of anhydrous, hydrated, aqueous solution, or a combination thereof.

7. The process according to claim 6, wherein the anhydrous or the hydrated calcium chloride is in fine ground powder form.

8. The process according to claim 1, wherein particle size of the chromite ore or the chromite concentrate is less than 48 Tyler mesh.

9. The process according to claim 1, wherein the carbonaceous reductant with particle size fraction passing 100 Tyler mesh is used.

10. The process according to claim 1, wherein after step (a), the feed material is agglomerated by pelletizing or briquetting to form pellets or briquettes, prior to step (b).

11. The process according to claim 1, step (c) is performed in a heating vessel heated by burning fuels.

12. The process according to claim 11, wherein the heating vessel is one selected from a shaft furnace, a multi hearth furnace, a tunnel kiln, and a rotary kiln.

13. The process according to claim 1, wherein in step (c) the elevated temperature is in the range of 1200° C. to 1400° C.

14. The process according to claim 1, wherein a reaction time of the direct reduction in step (c) is 2 hours or less.

15. The process according to claim 1, wherein in step (c) the product mixture comprises the ferrochrome alloy and residual gangue and spinel, wherein the ferrochrome alloy is segregated from the residual gangue and spinel.

16. The process according to claim 1, wherein the off-gas produced from step (c) comprises carbon monoxide.

17. The process according to claim 16, wherein the carbon monoxide is processed by scrubbers and subsequently stored or combusted for heat recovery.

18. The process according to claim 1, wherein the solid product produced from step (c) is further processed by leaching with water to recover calcium chloride.

19. The process according to claim 18, further comprising a step of breaking the solid product from step (c) by mild crushing.

20. The process according to claim 18, wherein the calcium chloride is re-generated through further processing a leachate produced by the leaching, and is subsequently recycled in its solid form or in a form of concentrated aqueous solution.

21. The process according to claim 20, further comprising heating the leachate to precipitate or concentrate the calcium chloride through evaporation, wherein the heat required is produced by burning fuels or the off-gas produced from step (c).

22. The process according to claim 1, wherein in step (d) physical separation of the ferrochrome alloy from unwanted materials is performed by gravity, sieving, magnetic separation, or a combination thereof.

* * * * *

UNITED STATES PATENT AND TRADEMARK OFFICE
CERTIFICATE OF CORRECTION

PATENT NO. : 10,982,300 B2
APPLICATION NO. : 16/499059
DATED : April 20, 2021
INVENTOR(S) : Dawei Yu et al.

Page 1 of 1

It is certified that error appears in the above-identified patent and that said Letters Patent is hereby corrected as shown below:

In the Claims

At Column 14, Line 12, in Claim 1, the phrase 'in the a range of,' should read - in the range of -.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*